(12) United States Patent
Umlauft et al.

(10) Patent No.: US 8,690,102 B2
(45) Date of Patent: Apr. 8, 2014

(54) FASTENING ARRANGEMENT FOR FASTENING A COMPONENT ON A FUSELAGE

(75) Inventors: Sebastian Umlauft, Hamburg (DE); Henryk Wenzel, Kleinmachnow (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/457,751

(22) Filed: Apr. 27, 2012

(65) Prior Publication Data

US 2012/0228431 A1    Sep. 13, 2012

Related U.S. Application Data

(63) Continuation of application No. PCT/EP2010/066208, filed on Oct. 27, 2010.

(60) Provisional application No. 61/255,396, filed on Oct. 27, 2009.

(30) Foreign Application Priority Data

Oct. 27, 2009    (DE) .......................... 10 2009 050 736

(51) Int. Cl.
*B64D 1/00*    (2006.01)
*E04C 3/00*    (2006.01)

(52) U.S. Cl.
USPC ................................ 244/131; 52/831; 403/24

(58) Field of Classification Search
USPC ................. 244/118.1, 119, 131; 52/831, 837; 403/24, 286; 267/80, 103, 110
See application file for complete search history.

(56) References Cited

U.S. PATENT DOCUMENTS

| | | | |
|---|---|---|---|
| 3,525,490 A | | 8/1970 | Duncan et al. |
| 3,994,451 A | | 11/1976 | Cole |
| 4,621,780 A | * | 11/1986 | Doyhamboure et al. .. 244/118.2 |
| 4,648,570 A | | 3/1987 | Abdelmaseh et al. |
| 5,207,045 A | * | 5/1993 | Bodnar ........................... 52/600 |
| 5,217,184 A | * | 6/1993 | Hararat-Tehrani ......... 244/118.1 |
| 5,785,303 A | * | 7/1998 | Kutschi ......................... 267/103 |
| 6,173,550 B1 | * | 1/2001 | Tingley ........................... 52/837 |
| 8,074,928 B2 | | 12/2011 | Haack et al. |
| 2002/0150747 A1 | | 10/2002 | Wellman et al. |
| 2010/0133381 A1 | | 6/2010 | Klaukien et al. |

FOREIGN PATENT DOCUMENTS

| | | |
|---|---|---|
| DE | 102007019305 A1 | 11/2008 |
| WO | 2008129038 A1 | 10/2008 |
| WO | 2009098098 A2 | 8/2009 |

OTHER PUBLICATIONS

International Searching Authority, International Search Report dated Oct. 5, 2011 for International Application No. PCT/EP2010/066208.
German Patent Office, German Office Action in Patent Application No. 10 2009 050 736.1, mailed Feb. 21, 2013.

\* cited by examiner

*Primary Examiner* — Rob Swiatek
(74) *Attorney, Agent, or Firm* — Ingrassia Fisher & Lorenz P.C.

(57) ABSTRACT

A mounting assembly for the mounting of components in a body of a vehicle comprises at least one base element, at least one holding rail and connecting elements. The base element is designed to be arranged on the body of the vehicle. The holding rail is designed for mounting the components, and the base element and the holding rail are connected by the connecting elements so as to be spaced apart from each other.

13 Claims, 11 Drawing Sheets

FASTENING ARRANGEMENT FOR FASTENING A COMPONENT ON A FUSELAGE

CROSS-REFERENCE TO RELATED APPLICATIONS

This is a continuation of International Application No. PCT/EP2010/066208, filed Oct. 27, 2010, which claims priority to U.S. Provisional Patent Application No. 61/255,396, filed Oct. 27, 2009 and to German Patent Application No. 10 2009 050 736.1, filed Oct. 27, 2009, which are hereby incorporated by reference in their entirety.

TECHNICAL FIELD

The technical field relates to a mounting assembly for mounting a component on an aircraft fuselage, to an aircraft comprising such a mounting assembly, and to a method for producing such a mounting assembly.

BACKGROUND

In aircraft a multitude of components that contribute to the design of an aircraft cabin are arranged on stiffening elements of the aircraft fuselage. The stiffening elements are frequently formed as so-called frame elements that are arranged at regular spacing across the longitudinal axis of the aircraft fuselage, and by so-called stringers that are arranged at regular spacing from each other in longitudinal direction of the aircraft fuselage. Thus, for example, overhead bins are installed in aircraft cabins, which bins extend, for example, over four frame elements arranged side by side and are correspondingly mounted on the frame elements and on stringers with five or more holding devices.

The above is relatively cumbersome because placing drill holes, debarring the drill holes, installing the overhead bins and aligning them involves very considerable expenditure on labor and time. In addition, the various holding devices and mounting elements required for connection to the stiffening elements could contribute to an increase in the overall weight of the aircraft. Furthermore, the requirements of the mounting assemblies are not inconsiderable in terms of the load carrying capacity because according to JAR 25.561, or other guidelines, maximum effective accelerations of 9 g in the direction of longitudinal extension of the aircraft, which are normally the x-axis in the aircraft's fixed coordinate system, are to be expected in case of emergency landings on land or on water, and in the example of the overhead bins as components their load is substantial in some areas. In addition to the above, thermal contraction and expansion movements of the aircraft and of the components to be mounted, as well as flexural and torsional deformation occurring during flight operations, contribute to additional loads acting on the primary structure of the aircraft fuselage.

DE 10 2007 019 305 A1 and WO 2008 129 038 A1 show a mounting assembly for mounting a component on an aircraft fuselage, in which mounting assembly an elongated stringer can be mounted to the aircraft fuselage, which stringer comprises a multitude of holes placed one behind the other in longitudinal direction, with fittings mounted to components being able to engage said holes in a positive-locking manner.

Therefore, at least one desirable feature is a mounting assembly that is to provide adequate load carrying capacity while at the same time being of a lightweight construction, as well as to provide the lowest possible requirements relating to drill holes in the primary structure, and the highest-possible flexibility. In addition, at least one object is to provide a mounting assembly that is automatically in a position to be able to automatically compensate for mechanical movement due to flight maneuvers or contraction and expansion movements in the aircraft fuselage so that destruction of the mounting assembly is prevented even in a material mixture of fiber-reinforced composite materials and metallic materials. Furthermore, at least another object is to provide an aircraft comprising a corresponding mounting assembly and a method for manufacturing a corresponding mounting assembly. Moreover, other objects, desirable features and characteristics will become apparent from the subsequent summary and detailed description, and the appended claims, taken in conjunction with the accompanying drawings and this background.

SUMMARY

A mounting assembly is provided for mounting a component on an aircraft fuselage. The mounting assembly comprises an elongated base element that is connectable to the aircraft fuselage, and a holding rail that is connected to the base element by way of connecting elements. The elongated base element and the holding rail comprise a receiving device for receiving the connecting elements. The connection between the base element and the holding rail is designed in such a manner that the base element and the holding rail are spaced apart from each other. The term "mounting assembly" refers to a combination of essentially three different elements.

An elongated base element is used for mounting the mounting assembly to an aircraft fuselage and for even introduction of all the loads occurring. The base element is preferably made from the same material as the aircraft fuselage so that the base element and the aircraft fuselage comprise the same thermal expansion characteristics and in this manner any unnecessary occurrence of thermal stress at the connecting position between the base element and the aircraft fuselage can be prevented. Thus, if the aircraft fuselage were to be manufactured from a fiber-reinforced composite material, it makes sense for the base element to also be made from the same fiber-reinforced composite material and to connect it to the aircraft fuselage using any type of connection. In particular, rivet connections, screw connections and adhesive connections would be suitable. The term "adhesive connection" can also refer to laminating into place or the like. The holding rail is designed in such a manner that it can be arranged at a predetermined distance from the base element. The connection between the base element and the holding rail is implemented by the so-called connecting elements. The material of the holding rail can correspond to the material of the base element, but it can also be manufactured from a different material. If a base element is used that, for example, comprises a fiber-reinforced composite material, in contrast to this, for example, the holding rail may comprise an aluminum alloy that ensures particularly flexible implementation of mounting supports of components. The holding rail may comprise grid spacing as is known from floor rails for aircraft cabins.

Arranging the base element and the holding rail apart from each other makes it possible to introduce different thermal expansion of the components to be mounted, or of mechanical loads, primarily to a separate element in the form of the holding rail so that to a large extent mechanical decoupling of these loads from the primary structure can be achieved. At the same time, by providing a holding rail a completely variable option of mounting assemblies within the aircraft cabin can be provided, which option is independent of the position of stiffening elements.

The base element can at the same time assume the function of a stiffening element, for example of a longitudinal stiffening element (stringer) for the aircraft fuselage. In this manner a separate stiffening element may be saved, which has a positive effect on the weight balance of the mounting assembly. Accordingly, the base element preferably comprises a profile with an adequate moment of inertia of area, which profile is furthermore designed to establish a connection with the connecting elements and for this purpose comprises a U-shaped, L-shaped or some similar profile in some regions. The connecting elements can then establish a connection with one or several arms or arm sections of the profile of the base element. Preferably, the base element or the mounting assembly according to the invention is arranged on a longitudinal seam of the corresponding aircraft fuselage so that the longitudinal seam is continuously closed. The mounting assembly may correspondingly also be used as a longitudinal seam stringer so that significant weight advantages can result from this functional integration.

The connecting elements are arranged in a framework-like manner between the holding rail and the base element. In this arrangement the term "in a framework-like manner" relates to an arrangement and to positioning of connecting elements, which arrangement and positioning are repetitive at least in a predominant region, in a zigzag or cross arrangement comprising several bars that at least in pairs are interconnected by their ends. To this effect the connecting elements in each case comprise a first end and a second end. The first ends are connected to the base element, and the second ends are connected to the holding rail. According to an exemplary embodiment, in each case two first ends of two adjacent connecting elements are arranged on the same point of the base element, while two second ends of a pair that is adjacent to the aforesaid are arranged at a shared point on the holding rail. For example, in the case of an elongated design of the connecting elements this results in a zigzag structure.

According to an embodiment, pairs of connecting elements are provided whose respective second ends are interconnected, while the respective first ends are spaced apart from each other. Both connecting elements of a pair of connecting elements comprise a convex curvature at least in some sections. In this manner, correspondingly, a triangle of a framework structure is implemented, with the sides of the triangle being curved towards the outside so that, during displacement of the two ends relative to the first ends depending on the particular direction of load, pulling straight or bending of the respective connecting element in a guided predetermined direction takes place. Correspondingly, by way of geometric pre-curvature of the connecting elements, predefined bending directions and consequently more precisely predictable bending behavior or deformation behavior of the connecting elements can be implemented. In particular, in the case of thermal expansion of a holding rail relative to the base element, in this manner very precise take-up of shearing stress with pre-determined deformation behavior can be achieved with the connecting elements, without this having a negative effect on the base element and thus on the primary structure of the aircraft element.

In an embodiment of the mounting assembly this effect can be increased in that in a first region the connecting elements of a pair comprise a convex curvature, and in a second region a concave curvature. The so-called "S-shape" achieved in this manner supports a defined excursion and consequently predictable bending lines, so that the strength of the connecting elements can be determined more precisely by design.

In an embodiment of the mounting assembly, the individual connecting elements taper off from their first ends to their second ends. Consequently, the edge of a connecting element, which edge is attached to the base element, is significantly wider than the edge of the holding rail so that the moment of inertia of area for taking up loads in the connecting element plane is optimized.

At the same time, to achieve a reduction in the weight of a connecting element it makes sense to provide at least one recess in each connecting element. The hole may, for example, be triangular in shape if the connecting elements taper off from the first end towards the second end so that a shape arises that is essentially similar to that of a triangle.

In order to improve manufacture, in each case an insert sleeve is arranged on a pair of connecting elements on interconnected first ends and/or second ends. Consequently, the individual pairs can be produced in a single piece, for example, by laminating or the like. Providing insert sleeves obviates the need to provide a highly complex and thus expensive provision of mounting points in the manufacture of the basic structure of the connecting elements; instead, the aforesaid can be connected separately to the connecting elements.

In another embodiment, the connecting elements are already integrated in a primary structure of the aircraft, which primary structure is made from a fiber material, or integrated in a base element, preferably without the use of insert sleeves. In this manner a significantly lighter weight of the mounting assembly may be achieved than is the case with separate elements to be interconnected.

According to an embodiment of the mounting assembly according, several connecting elements in the form of an individual component are produced in a continuous production process. As a result of this the manufacturing costs and the variety of components are reduced, and mounting the connecting elements on the base element and on the holding rail is simplified, because it is not necessary to grab, position and attach a multitude of individual connecting elements, but merely to hold a single component and subsequently mount it.

In an embodiment of the mounting assembly according to the invention the base element and the connecting elements comprise a fiber-reinforced composite material. Consequently, the mounting assembly is particularly suitable for use on an aircraft fuselage comprising a fiber-reinforced composite material.

At the same time it is particularly preferred to manufacture the holding rail from a metallic material. This may, for example, be an aluminum alloy, and consequently no adaptations of mounting methods are necessary, and furthermore the holding rail can be used as a ground conductor for electrical systems, which would be advantageous in particular in the integration of the mounting assembly in a non-metallic fuselage.

The holding rail may additionally comprise channels or channel-like indentations to receive cables and lines, wherein the channel-like indentations are preferably open on the side of the mounting assembly facing away from the base element. Cables can be placed and mounted in these cable guides. The cable guide is not only used for mechanical holding, but in particular also for shielding indirect effects during lightning strikes. In the case of lightning strikes, in fuselages comprising composite materials comprising carbon fibers or the like, the current may be conducted away by way of fine metal structures in such a fuselage laminate. However, at the position of the lightning strike, a field may arise that can trigger induction currents in metallic conductors. Shielding with such cable guides contributes to collecting these induction currents and leading them away.

According to a further embodiment, a method for producing a mounting assembly is proposed, with the method involving the following steps: providing a base element; forming a first receiving device in the base element; providing connecting elements with second receiving devices; arranging the connecting element with a second receiving device corresponding to the first receiving device of the base element; connecting the base element and the connecting elements with respective receiving devices; providing a holding rail with a third receiving device; arranging the holding rail with the third receiving device corresponding to a second receiving device of each connecting elements; and connecting the holding rail with the connecting elements.

In this arrangement the receiving devices can be of any form and merely need to carry out the task of establishing a connection to another element. In particular, the receiving devices may be receiving holes that are suitable for studs, rivets or other connecting means having positive or non-positive fit to be inserted through them. This means that drill holes from the connecting elements are arranged so as to be flush with drill holes of the base element, and that subsequently suitable connections are driven through the drill holes so that a pivotable but nevertheless stationary connection between the base element and the connecting elements can be ensured. This applies analogously to the connection between the connecting elements and the holding rail.

These method-related steps can be preceded by further steps for producing the base element, the connecting elements and the holding rail. The following explanations are based, for example, on the use of fiber-reinforced composite materials for manufacturing the connecting elements and the base element. For example, it is imaginable for the base element to be produced by providing a fiber fabric or fiber mat, by draping a fiber fabric in a corresponding shape, and by subsequent curing. The receiving device can be inserted during the draping process, for example in the form of receiving sleeves or the like; as an alternative to this it is also possible to produce receiving holes or recesses with conventional materials processing methods after the base element has cured. The same applies to the production of the connecting elements, in which during the draping process, for example, receiving sleeves can be integrated before being firmly laminated into place. The holding rail may comprise a metallic material that can be manufactured with conventional materials processing methods, for example, by pultrusion, subsequent milling, and manufacturing receiving means, for example by drilling, milling, grinding or by positioning separate elements.

According to a further embodiment, an aircraft is provided with an aircraft fuselage and with one or several mounting assemblies arranged on the aircraft fuselage, so that installations can be mounted in a particularly flexible manner without having any significant negative effect on the primary structure.

BRIEF DESCRIPTION OF THE DRAWINGS

Further characteristics, advantages and application options are disclosed in the following description of the exemplary embodiments and of the figures. All the described and/or illustrated characteristics per se and in any combination form the subject of the described embodiments, even irrespective of their composition in the individual claims or their interrelationships. Furthermore, identical or similar components in the figures have the same reference characters, where:

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
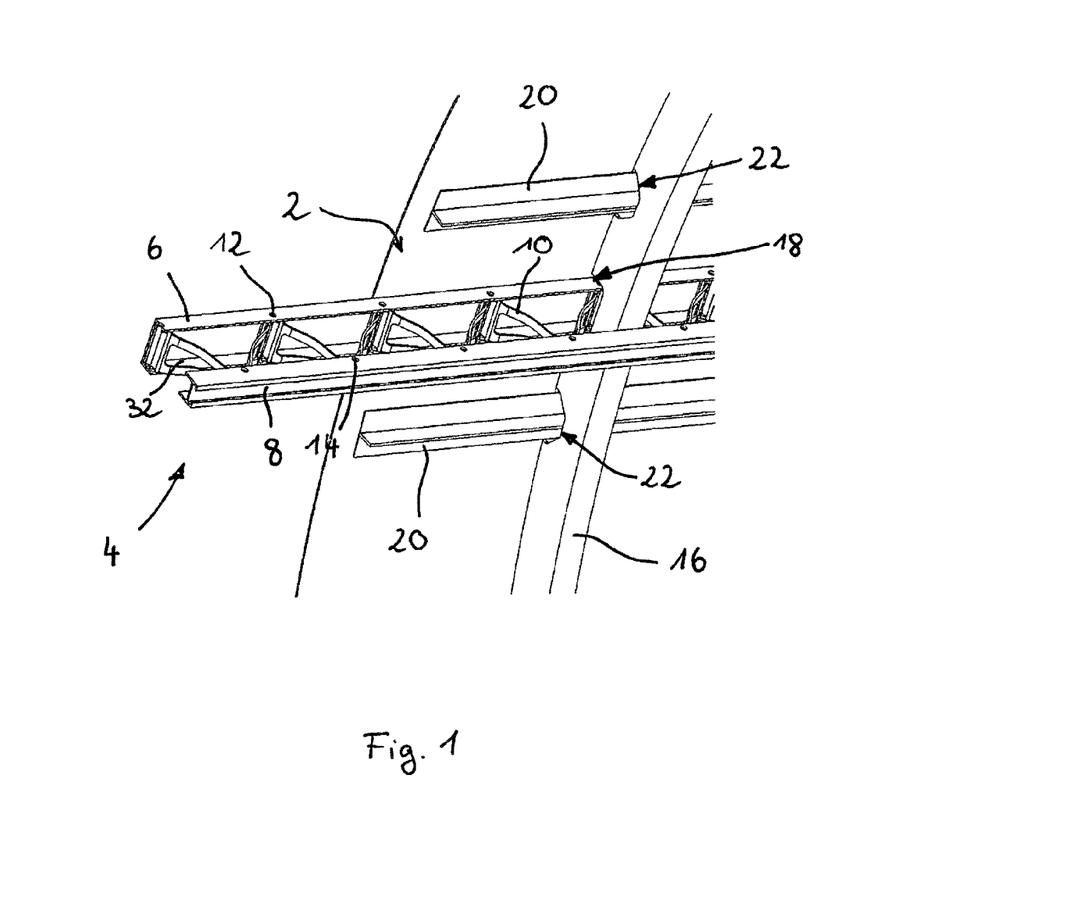
FIG. 1 shows a three-dimensional view of a mounting assembly according to an embodiment on an aircraft fuselage.

FIG. 1 shows part of an aircraft fuselage 2, on which a mounting assembly 4 according to the invention is arranged. The mounting assembly 4 comprises a base element 6, an exemplary holding rail 8 with a double-T profile, and connecting elements 10 arranged in between. In the example shown in FIG. 1, the base element 6 and the holding rail 8 extend parallel to each other and are spaced apart from each other and mechanically interconnected by the connecting elements 10. The base element 6 comprises receiving device 12 that has been implemented in the form of receiving holes. The holding rail 8 also comprises receiving device 14 which as an example are designed as receiving holes.

Furthermore, the illustration shows a frame element 16 on the fuselage 2, which frame element 16 comprises an essentially ring-shaped structure and is arranged across the longitudinal axis of the fuselage 2. To allow mounting the mounting assembly 4, the frame element 16 comprises at least one recess 18 which, as an example, is designed as a through-hole, often referred to as a "mouse hole".

In addition, as an example, two longitudinal stiffening elements 20 are arranged so as to be parallel to the mounting assembly 4 and also pass through corresponding holes 22 in the frame element 16. The longitudinal stiffening elements 20 are also referred to as "stringers"; however, they are not relevant in the context of the mounting assembly.

With the mounting assembly 4, components can be mounted in an aircraft fuselage 2 without the components to be installed being arranged directly on the primary structure with a multitude of different holding devices. Taking into account the respective geometry of the frame elements 16 and the stringers, and taking into account their spacing from each other, are no longer relevant.

The mounting assembly 4 can be arranged in a host of different ways on the fuselage 2. For example, it would be possible to laminate the base element 6 into an aircraft fuselage 2 manufactured from a fiber-reinforced composite material at the time of manufacturing the aircraft fuselage 2; on the other hand bonding, riveting, screwing or mounting with the use of an alternative method would also be imaginable; there are no limits of implementation to the average person skilled in the art. Depending on the material selection of the base element 6, welding may also be considered, for example if the base element 6 and the aircraft fuselage 2 are made from aluminum or some other metallic material used in aircraft construction.

Decoupling the holding rail 8 from the primary structure of the aircraft makes it possible to implement a completely flexible holding arrangement of components without being dependent on type-specific frame element spacing or stringer spacing. At the same time, decoupling also ensures that different thermal expansion of the holding rail 8 and the base element 6 or of the objects to be mounted is taken into account in such a manner that only quite modest thermal stress is introduced into the primary structure. As a result of their specific form the connecting elements 10 are designed to take up a large part of such thermal stress.

Figure 2A:
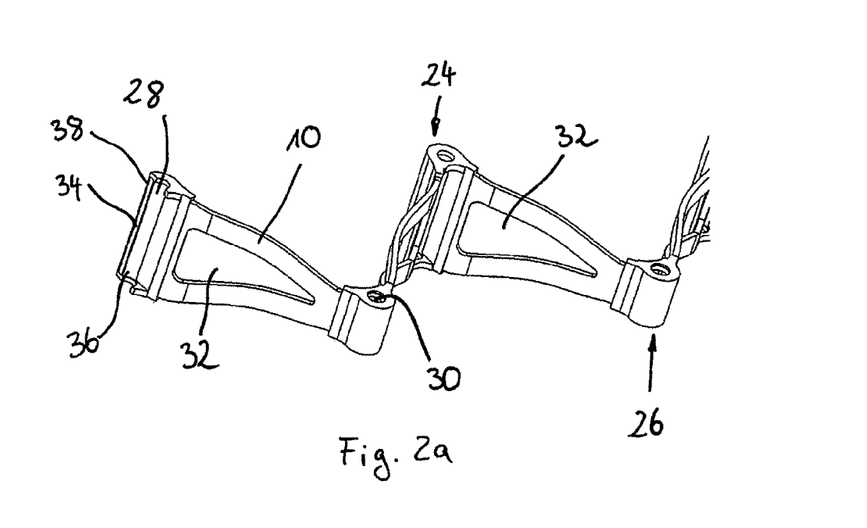
FIG. 2a and FIG. 2b show a longitudinal section connecting elements and an insert sleeve of a connecting element.

FIG. 2a shows the specific form of the connecting elements 10 in more detail. The connecting elements 10 comprise first ends 24 and second ends 26. The first ends 24 are designed for mounting the connecting elements 10 to the base element 6, and the second ends 26 are designed for connecting to the holding rail 8. To this effect the connecting elements 10 comprise receiving sleeves 28 and 30 through which studs, rivets or the like are inserted. The receiving sleeves 28 and 30 are arranged so as to correspond to the receiving means 12 and 14 of the base element 6 and of the holding rail 8.

In the exemplary illustration, the connecting elements 10 taper off from their first ends 24 to their second ends 26. This can ensure that the greatest possible moment of inertia of area is present in the region of the base element 6, in particular in order to take up the loads in the y-axis of the aircraft. For reasons associated with weight the connecting elements 10 shown furthermore comprise a recess 32 so that the connecting elements 10 are essentially triangular in shape. The illustration further shows that the connecting elements 10 comprise a so-called "S-shape" that makes it possible to assume a predefined buckling and bending position.

Figure 2B:
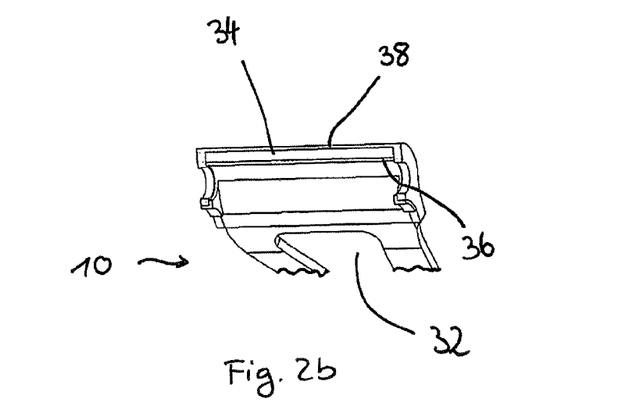

FIG. 2b shows in more detail a receiving sleeve 28 of a first end 24 of a connecting element 10, which receiving sleeve 28 may, for example, be arranged on a tab 34 comprising a fiber-reinforced composite material, and comprises two sleeve halves 36 and 38, each arranged on one side of the tab 34.

Figure 3:
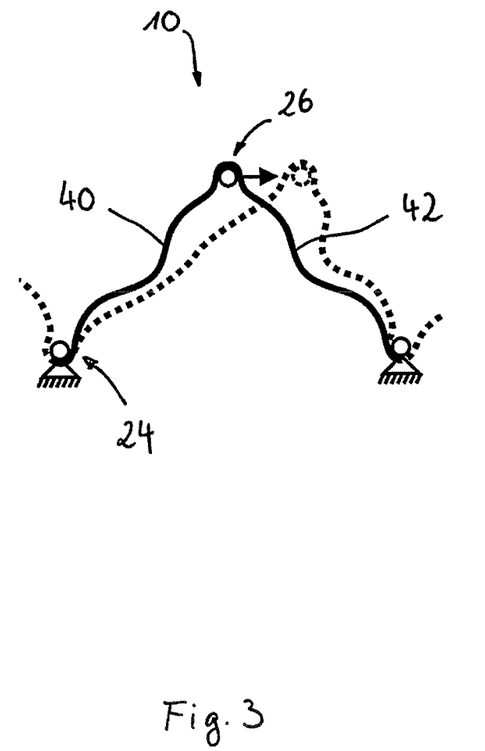
FIG. 3 diagrammatically shows the equalization movement with loads acting on a connecting element.

FIG. 3 diagrammatically shows the manner in which a connecting element 10 as soon as a force acts on the second end 26. As a result of the "S-shape", stretching of a first leg 40 and bending of a second leg 42 take place. The type of bending is already predetermined by the shape of the second leg 42 and by exertion of a force only its amplitude is increased. This makes it possible to design the materials characteristics in a particularly precise manner, because, for example, no cases of buckling with an unforeseeable direction of buckling occur.

Figure 4:
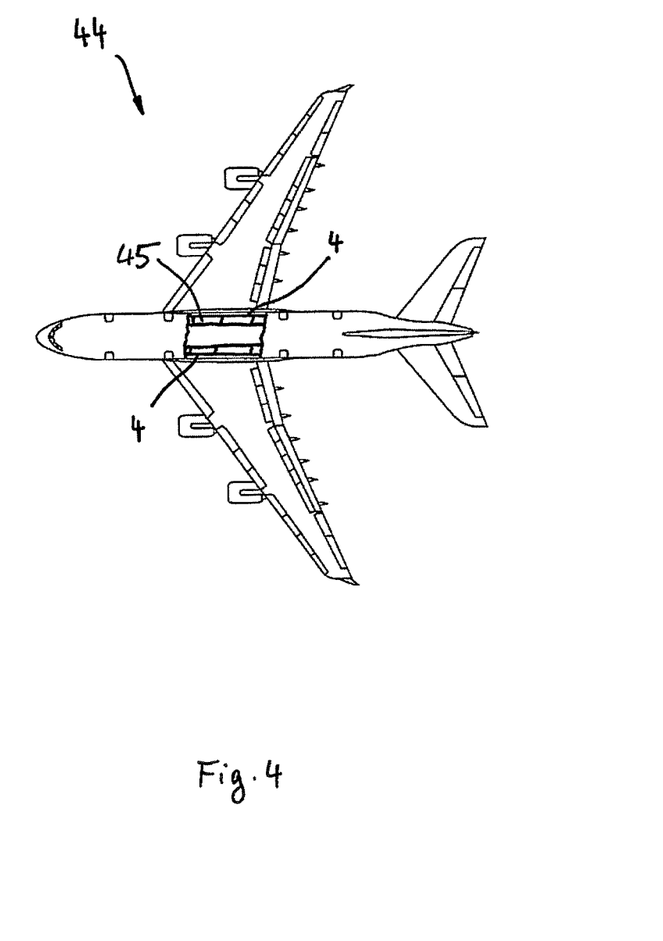
FIG. 4 shows an aircraft comprising at least one mounting assembly according to an embodiment.

FIG. 4 shows an aircraft 44 comprising several mounting assemblies 4, which, in one example, several components in the form of overhead bins are arranged.

Figure 5:
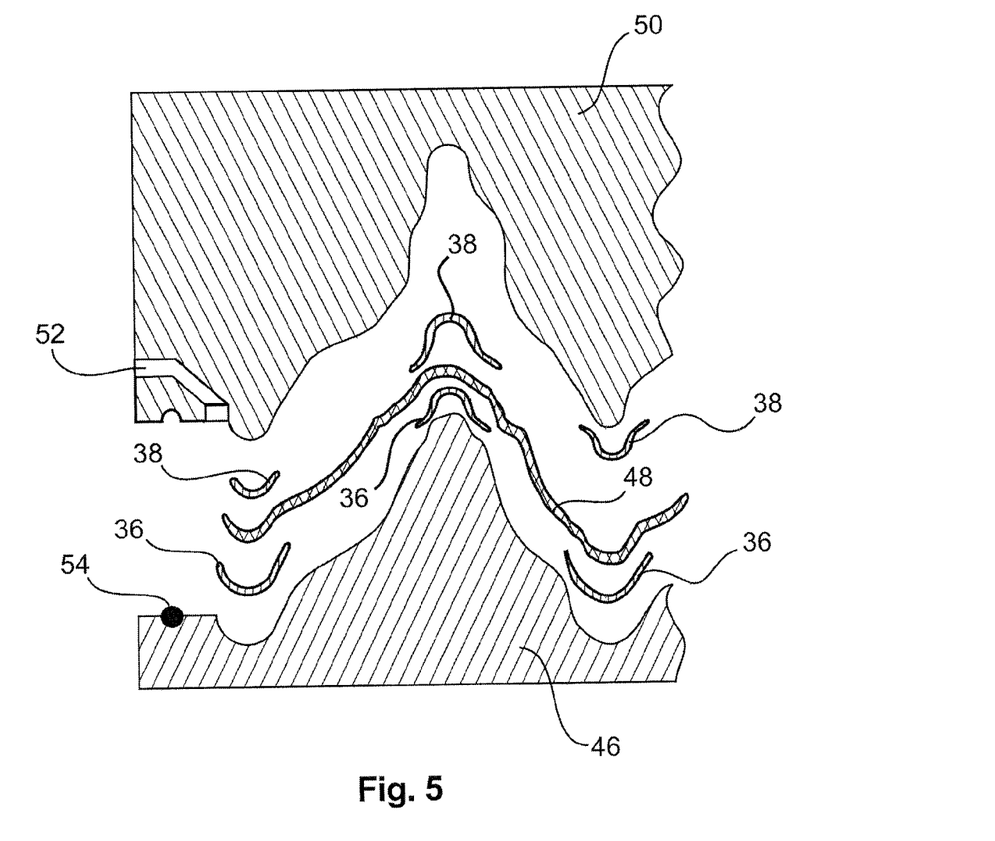
FIG. 5 shows a diagrammatic view of a process for producing a connecting element.

FIG. 5 diagrammatically shows the process of producing a connecting element 10 of the mounting assembly. In a resin infusion method with a closed mold, which method is, for example, used in the production, first the lower sleeve halves 36 may be placed in a correspondingly formed lower mold half 46. Subsequently it would be possible to drape a previously cut-to size semi-finished fiber material 48 over the lower mold half 46 and over the lower sleeve halves 36. After this, upper sleeve halves 38 can be placed onto the lower sleeve halves 36 and the semi-finished fiber material 48 situated above the aforesaid. Thereafter, an upper mold half 50 may be placed onto the laid/draped arrangement in order to produce a closed mold. With a known resin infusion method, also referred to as "resin transfer molding" or RTM, which method is used as an example, resin is supplied through an inlet 52. In this arrangement, connecting the upper and the lower sleeve halves 36 and 38 can take place prior to the resin infusion, for example by bonding, soldering or other suitable joining methods. As an alternative, joining can take place by placing the infusion resin between the mating surfaces of the sleeve halves 36 and 38. For this purpose the latter may comprise corresponding spacer elements in order to ensure constant space of the mating surfaces of the sleeve halves 36 and 38. They would, for example be in the shape of small elevations, of defined height, on the mating surfaces. By means of a seal 54 it is subsequently ensured that no resin can escape. After subsequent curing, the connecting element 10 can be removed.

Figure 6:
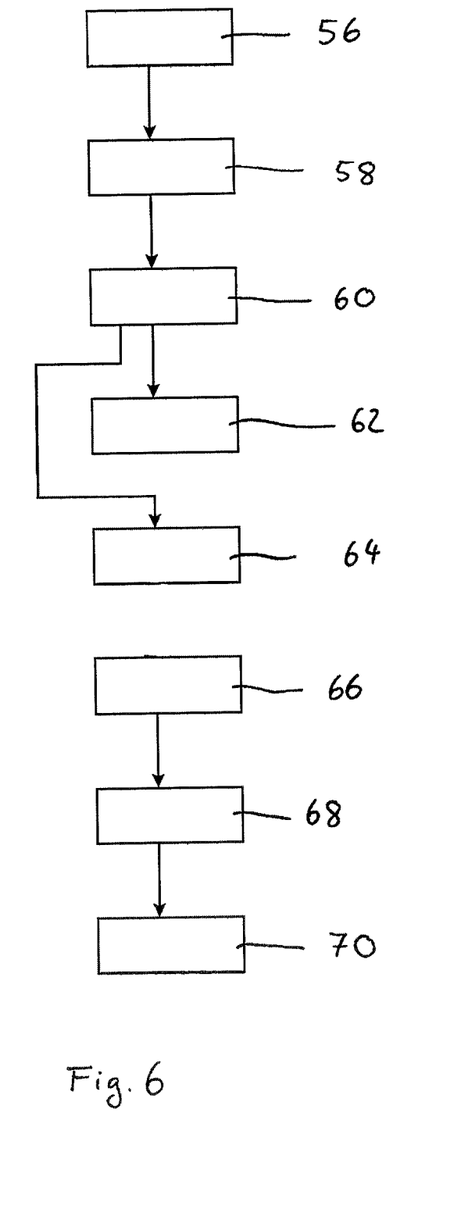
FIG. 6 shows a block diagram of the method according to an embodiment for producing a mounting assembly.

Furthermore, FIG. 6 shows a diagrammatic view of a method. The method comprises equipping 56 a lower mold half 46 with lower sleeve halves 36 is followed by draping 58 a semi-finished fiber material 48 over the lower mold half 46 and lower sleeve halves 36 by plugging 60 upper sleeve halves 38 onto lower sleeve halves 36 and the semi-finished fiber material 48 lying over them, and if applicable applying 62 joining means. Finally, this is followed by closing 64 the mold with an upper mold half 50, by infusing 66 a matrix material, for example a resin, by curing 68 and lastly by demolding 70.

Figure 7:
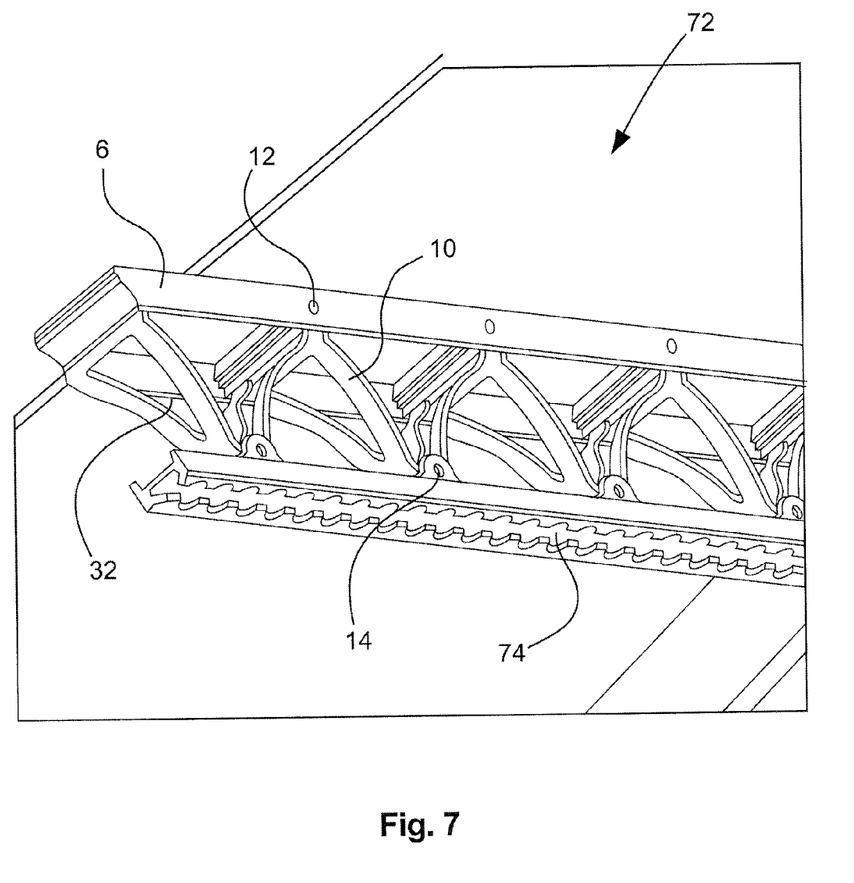
FIG. 7 shows an additional exemplary embodiment of a mounting assembly according an embodiment with a grid rail.

FIG. 7 shows a further exemplary embodiment of a mounting assembly 72, in which assembly 72 the holding rail is designed as a grid rail 74. The grid rail 74 may, for example, correspond to a commonly used seat rail of aircraft cabins that comprises a grid spacing of 1 inch. This arrangement is particularly advantageous in that it makes it possible to insert suitable insert pieces into the grid rail 74, to displace them along its extension, and at a desired position to be able to attach them at a predetermined grid spacing by screwing them in or the like. Correspondingly, already known mounting devices or mounting elements can be used for the holding of components, which mounting assemblies are technically mature from their use of seat rails in aircraft cabins.

Figure 8A:
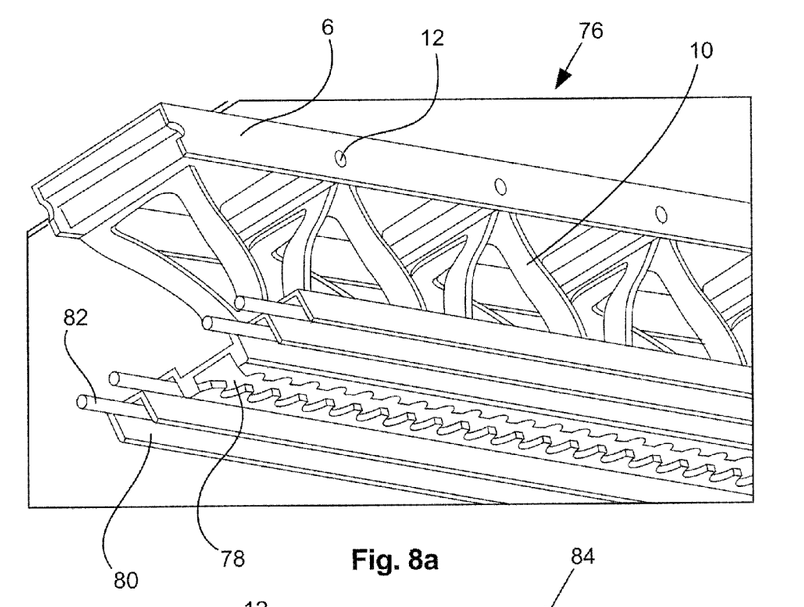
FIG. 8a and FIG. 8b show additional exemplary embodiments of a mounting assembly according to an embodiment with a grid rail and cable holders.
Figure 8B:
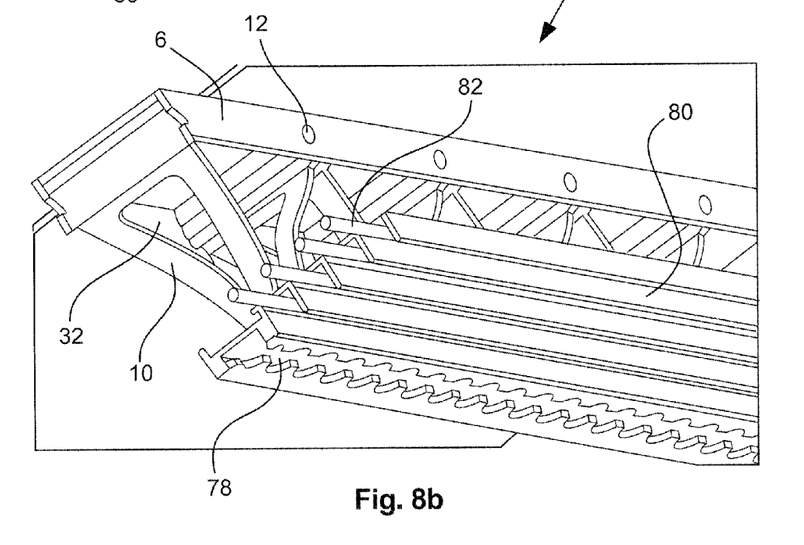

FIG. 8a and FIG. 8b show further mounting assemblies 76 and 84 the invention, in which a grid rail 78 comprises elongated channels 80 that extend so as to be parallel to the grid spacing, for feeding cables 82 through them. Consequently, cable holders and mounting assemblies can very easily be combined. The fed-through cables 82 can, for example, be fastened in the channels 80 with cable ties along the grid rail 78.

Figure 9:
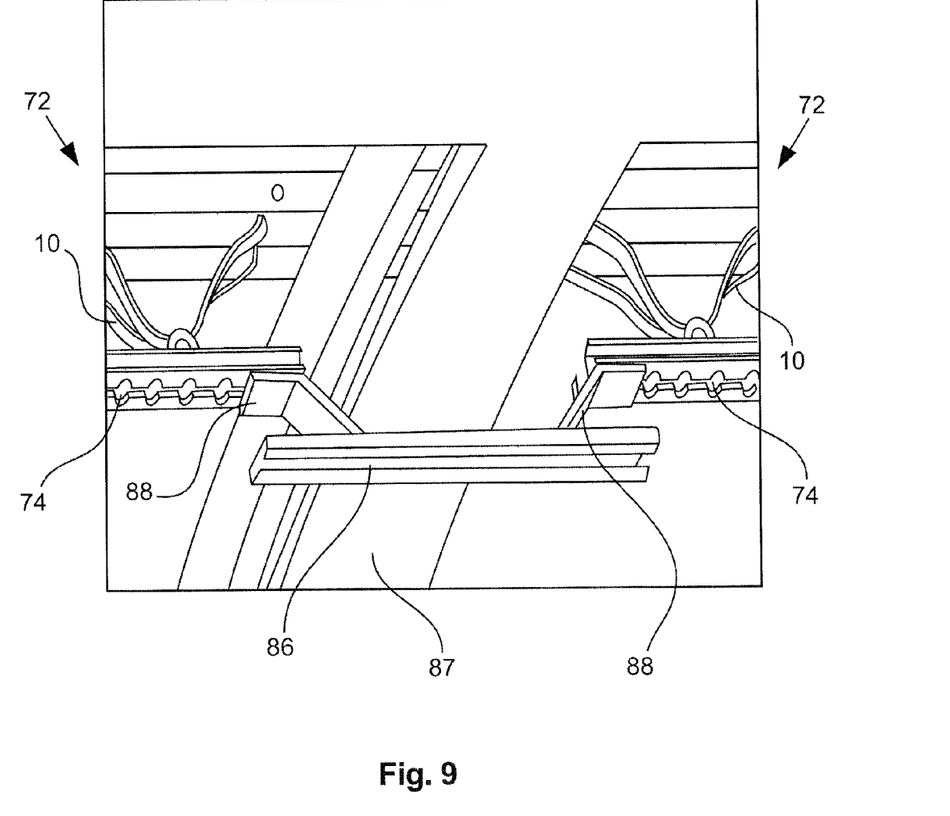
FIG. 9 shows an air conditioning pipe leading through two adjacent mounting assemblies according to an embodiment.

FIG. 9 shows an installation situation comprising two mounting assemblies 72, between which a bridging rail 86 is arranged on two angular support pieces 88 so that an air conditioning pipe 87 or the like can be fed through.

Figure 10:
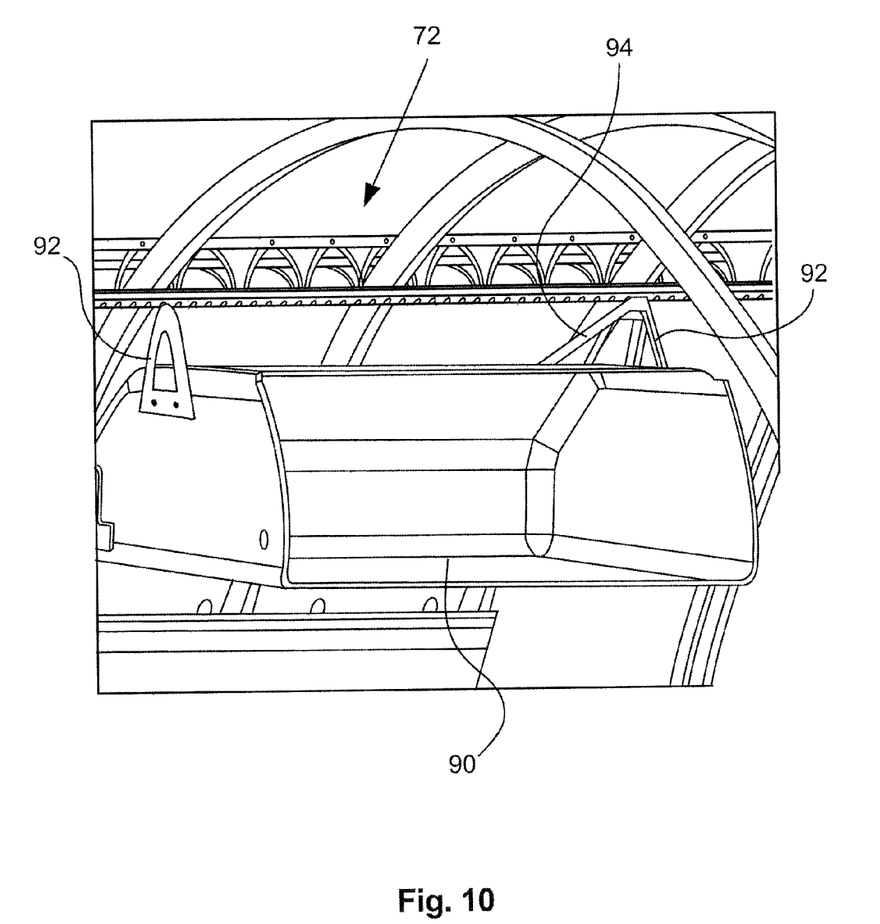
FIG. 10 shows an overhead bin attached to a mounting assembly according to an embodiment.

FIG. 10 shows an installation situation of an overhead bin 90 that is arranged on a mounting assembly 72. At the top of the bin 90 there are two angular support pieces 92 and 96 that can engage the grid rail 78 of the mounting assembly 72. To ensure adequate stability in longitudinal direction, in addition a diagonal brace 94 is arranged on the rear angular support piece 92 when viewed in the direction of travel.

Figure 11:
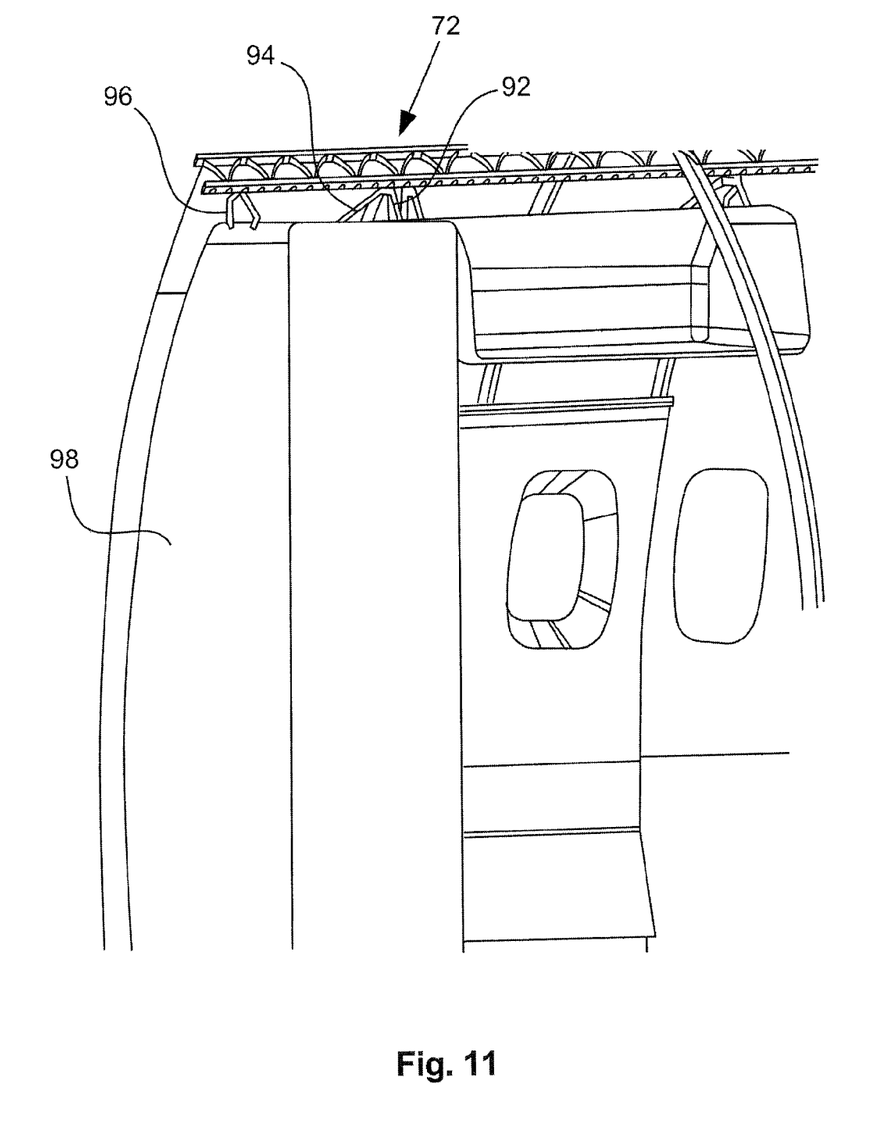
FIG. 11 shows a monument of a vehicle cabin, which monument is attached to a mounting assembly according to an embodiment.

Finally, FIG. 11 shows the manner in which monuments 98 can also be arranged, within an aircraft cabin or a vehicle cabin, on a mounting assembly 72. In the embodiment shown, for example, two angular support pieces 92 and 96 and one diagonal brace 94 are used, which make it possible to achieve spatially fixed positioning of the monument 98.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A mounting assembly for mounting components in a body of a vehicle, comprising:
   a base element coupled to a wall of the body of the vehicle;
   a holding element that is configured for mounting the components; and
   connecting elements connected to connect the base element and the holding element such that the base element and the holding element are spaced apart, each of the connecting elements including a first end coupled to the base element, a second end coupled to the holding element, and a body that tapers from the first end to the second end and defines a central recess that tapers from the first end to the second end,
   wherein the first ends of adjacent connecting elements together define a receiving sleeve substantially perpendicular to the body of the connecting elements for coupling the base element to the connecting elements.

2. The mounting assembly of claim 1,
   wherein the connecting elements form a framework-like structure.

3. The mounting assembly of claim 2, wherein the second ends of the connecting elements comprise insert sleeves.

4. The mounting assembly of claim 2, wherein pairs of connecting elements are interconnected at the second ends and comprise insert sleeves.

5. The mounting assembly of claim 1,
   wherein a region of the connecting elements comprise a convex curvature.

6. The mounting assembly of claim 5,
   wherein a first region of the connecting elements comprises the convex curvature, and
   wherein a second region comprises a concave curvature so that the connecting elements are S-shaped.

7. The mounting assembly of claim 1, wherein the connecting elements comprise a fiber-reinforced composite material.

8. The mounting assembly of claim 1, wherein the base element comprises a fiber-reinforced composite material.

9. The mounting assembly of claim 1, wherein the holding element comprises a metallic material.

10. An aircraft, comprising:
    a fuselage;
    a mounting assembly mounted in the fuselage; and
    a component mounted on the mounting assembly,
    wherein the mounting assembly comprises:
      a base element coupled to a wall of the fuselage;
      a holding element that is configured for mounting the component; and
      connecting elements connected to connect the base element and the holding element such that the base element and the holding element are spaced apart, each of the connecting elements including a first end coupled to the base element, a second end coupled to the holding element, and a body that tapers from the first end to the second end and defines a central recess that tapers from the first end to the second end,
      wherein the first ends of adjacent connecting elements together define a receiving sleeve substantially perpendicular to the body of the connecting elements for coupling the base element to the connecting elements.

11. The aircraft of claim 10,
    wherein the connecting elements form a framework-like structure.

12. The aircraft of claim 10,
    wherein a region of the connecting elements comprise a convex curvature.

13. The aircraft of claim 12,
    wherein a first region of the connecting elements comprises the convex curvature, and
    wherein a second region comprises a concave curvature so that the connecting elements are S-shaped.

* * * * *